(12) United States Patent
Dubost

(10) Patent No.: US 9,992,138 B1
(45) Date of Patent: Jun. 5, 2018

(54) METHOD AND APPARATUS FOR PROCESSING SCHEDULING REQUESTS IN A SHARED CALENDAR SYSTEM

(71) Applicant: CA, Inc., Islandia, NY (US)

(72) Inventor: Philippe Dubost, Prague (CZ)

(73) Assignee: CA, Inc., New York, NY (US)

( * ) Notice: Subject to any disclaimer, the term of this patent is extended or adjusted under 35 U.S.C. 154(b) by 413 days.

(21) Appl. No.: 13/952,125

(22) Filed: Jul. 26, 2013

(51) Int. Cl.
*G06F 15/16* (2006.01)
*H04L 12/58* (2006.01)

(52) U.S. Cl.
CPC ................... *H04L 51/00* (2013.01)

(58) Field of Classification Search
CPC .................. G06Q 10/1095; H04L 12/1818
USPC .................................. 709/204, 206
See application file for complete search history.

(56) References Cited

U.S. PATENT DOCUMENTS

| | | | | |
|---|---|---|---|---|
| 2003/0061087 A1* | 3/2003 | Srimuang | ........ | G06Q 10/06314 705/7.18 |
| 2006/0041460 A1* | 2/2006 | Aaron | ...................... | G09B 7/00 705/7.18 |
| 2007/0124371 A1* | 5/2007 | Desai et al. | .................. | 709/204 |
| 2007/0245026 A1* | 10/2007 | Martin | .................. | G06F 21/629 709/227 |
| 2013/0226645 A1* | 8/2013 | Renaghan | ..................... | 705/7.19 |
| 2013/0246595 A1* | 9/2013 | O'Donoghue | .......... | G06N 5/02 709/223 |

* cited by examiner

*Primary Examiner* — Cheikh Ndiaye
*Assistant Examiner* — Sherman Lin

(57) ABSTRACT

According to a computer-implemented method, a scheduling request is received to schedule a user in a shared calendar system as a participant in a meeting to occur on a specified date. Based on a predefined meeting policy, a determination is made of a maximum permissible quantity of meetings for the user to participate in during a predefined time period that includes the specified date. A quantity of meetings in the shared calendar system that are already scheduled for the user to occur within the predefined time period is compared to the maximum permissible quantity of meetings for the user. Based on the comparing indicating that the quantity of meetings already scheduled is greater than or equal to the maximum permissible quantity of meetings, a notification is transmitted to the user to indicate that that approval of the scheduling request would violate the predefined meeting policy.

14 Claims, 4 Drawing Sheets

METHOD AND APPARATUS FOR PROCESSING SCHEDULING REQUESTS IN A SHARED CALENDAR SYSTEM

TECHNICAL FIELD

The present disclosure relates to shared calendar systems, and more particularly relates to a method for processing scheduling requests in a shared calendar system.

BACKGROUND

Shared calendar systems, such as MICROSOFT OUTLOOK, GOOGLE CALENDAR, etc., have become popular for coordinating meetings among a group of meeting participants. This is especially true within organizations, where such tools can be used to coordinate meetings between various related parties in the organization. Typically one party (a "meeting organizer") selects a date, time, and place for a given meeting, and then invites various additional meeting participants ("meeting invitees") to the meeting. The meeting invitees are typically able to accept, decline, or propose a change to the meeting (e.g., different time/date). If any verification is performed when such meeting requests are created (and correspondingly accepted by invitees), it has been to determine whether the meeting participants are already scheduled for other meetings at the same time in order to avoid scheduling conflicts.

SUMMARY

According to one aspect of the present disclosure, a computer-implemented method is disclosed in which a scheduling request is received from a user to schedule the user in a shared calendar system as a participant in a meeting to occur on a specified date. Based on a predefined meeting policy, a determination is made of a maximum permissible quantity of meetings for the user to participate in during a predefined time period that includes the specified date. A quantity of meetings in the shared calendar system that are already scheduled for the user to occur within the predefined time period is compared to the maximum permissible quantity of meetings for the user. Based on the comparing indicating that the quantity of meetings already scheduled is greater than or equal to the maximum permissible quantity of meetings, a notification is transmitted to the user to indicate that approval of the scheduling request would violate the predefined meeting policy.

According to another aspect of the present disclosure, a computing device is disclosed that comprises a communication interface and a controller. The controller is configured to receive, via the communication interface, a scheduling request from a user to schedule the user in a shared calendar system as a participant in a meeting to occur on a specified date. The controller is further configured to determine, based on a predefined meeting policy, a maximum permissible quantity of meetings for the user to participate in during a predefined time period that includes the specified date. The controller is further configured to compare a quantity of meetings in the shared calendar system that are already scheduled for the user to occur within the predefined time period to the maximum permissible quantity of meetings for the user. The controller is further configured to, based on the comparing indicating that the quantity of meetings already scheduled is greater than or equal to the maximum permissible quantity of meetings, transmit a notification to the user to indicate that approval of the scheduling request would violate the predefined meeting policy.

According to another aspect of the present disclosure, a computer program product is disclosed that comprises a computer readable storage medium having computer readable program code embodied therewith. The computer readable program code comprises computer readable program code configured to receive a scheduling request from a user to schedule the user in a shared calendar system as a participant in a meeting to occur on a specified date. The computer readable program code further comprises computer readable program code configured to determine, based on a predefined meeting policy, a maximum permissible quantity of meetings for the user to participate in during a predefined time period that includes the specified date. The computer readable program code further comprises computer readable program code configured to compare a quantity of meetings in the shared calendar system that are already scheduled for the user to occur within the predefined time period to the maximum permissible quantity of meetings for the user. The computer readable program code further comprises computer readable program code configured to, based on the comparing indicating that the quantity of meetings already scheduled is greater than or equal to the maximum permissible quantity of meetings, transmit a notification to the user to indicate that approval of the scheduling request would violate the predefined meeting policy.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
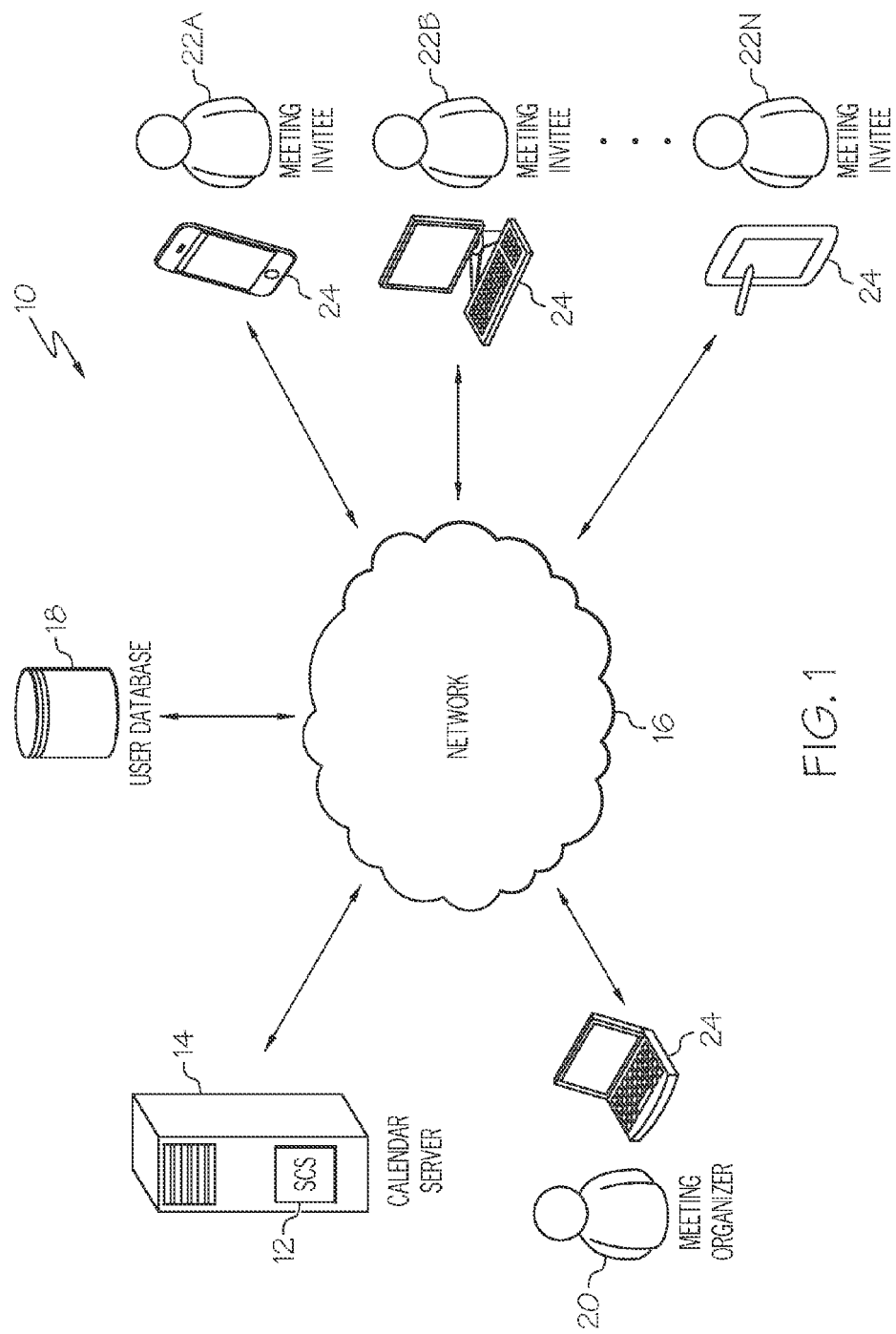
FIG. 1 illustrates an example computer network supporting a shared calendar system.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure relates to processing scheduling requests for users to be scheduled as participants in meetings in a shared calendar system. In connection with processing such requests, a computing device (e.g., a calendar server) determines if approval of the scheduling request would violate a predefined meeting policy providing a maximum permissible quantity of meetings for the user to participate in for a given time period. The computing device compares a quantity of meetings in the shared calendar system that are already scheduled for the user to occur within a time period including the requested meeting to a maximum permissible quantity of meetings for that user for that same time period. If the quantity of meetings already scheduled is greater than or equal to the maximum permissible quantity of meetings, a notification is transmitted to the user as an alert to indicate that approval of the scheduling request would violate the predefined meeting policy. Optionally, the request may be rejected in conjunction with transmitting the notification.

FIG. 1 illustrates an example computer network 10 utilizing a shared calendar system 12 accessible by a calendar server 14. A plurality of users 20, 22 utilize their respective computing devices 24 to communicate with the calendar server 14 through a network 16. The computing devices 24 may include laptop computers, desktop computers, tablet computers, smartphones, or any other device with network communication capabilities. In one or more embodiments the network 16 includes a wide area network (WAN), such as the Internet. A user database (e.g., MICROSOFT ACTIVE DIRECTORY) is accessible to the calendar server 14 either locally or through the network 16. Although the shared calendar system 12 is shown as being stored in the calendar server 14, it is understood that this is only an example and that the shared calendar system 12 could be stored elsewhere.

A meeting organizer 20 sends a meeting request to meeting invitees 22A-22N using the shared calendar system 12 through, e.g., a web-based interface or a local client (e.g., MICROSOFT OUTLOOK or a smartphone application). Upon receiving the meeting request, the various meeting invitees 22A-N are presented with a choice to accept or decline the meeting request. Each of the users 20, 22 has an assigned maximum permissible quantity of meetings for a given time period, and when processing requests from the users to be scheduled for a given meeting in the shared calendar system 12, the calendar server 14 takes this maximum permissible quantity of meetings into consideration, as discussed below.

Figure 2:
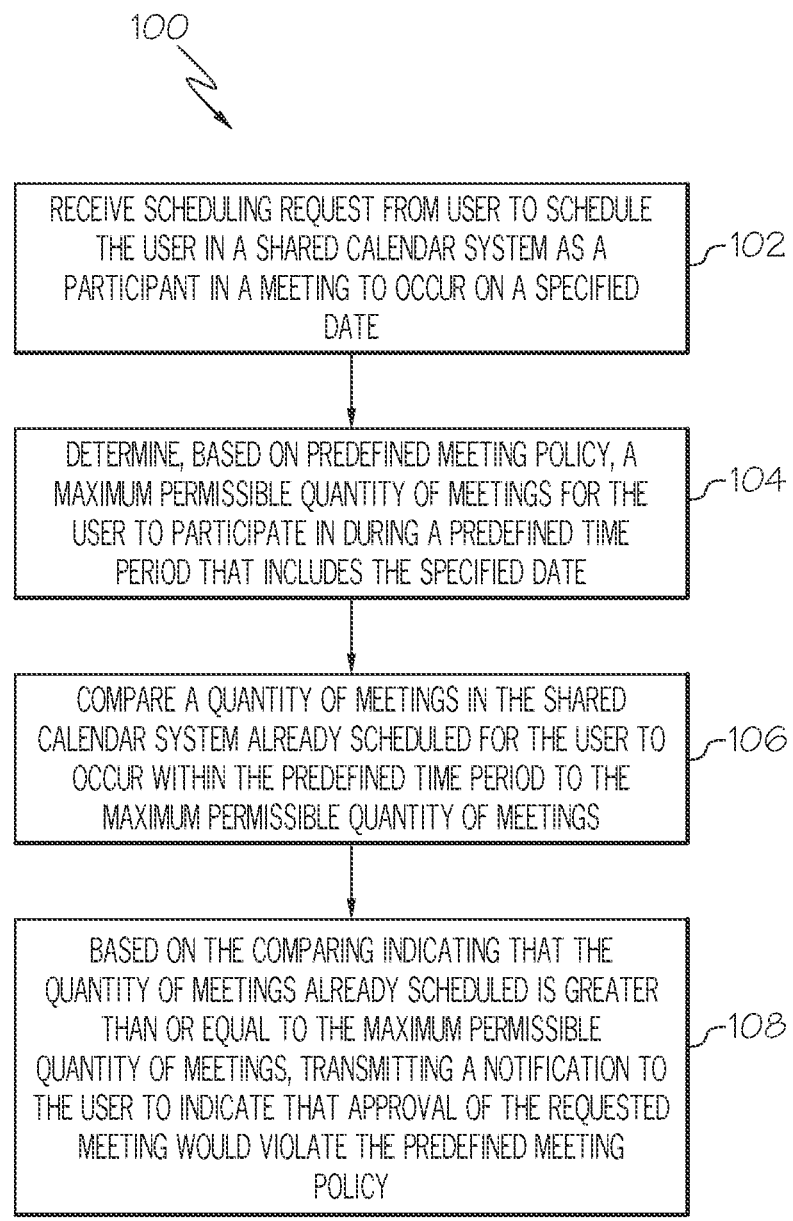
FIG. 2 schematically illustrates a method for processing a scheduling request from a user to schedule the user in a shared calendar system as a participant in a meeting.

FIG. 2 schematically illustrates a method 100 implemented by a computing device (e.g., calendar server 14), for handling a scheduling request from a user 20, 22 to schedule the user 20, 22 in the shared calendar system 12 as a participant in a meeting. The calendar server 14 receives a scheduling request from a user to schedule the user in the shared calendar system 12 as a participant in a meeting to occur on a specified date (block 102). In one or more embodiments, the request of block 102 corresponds to a request by meeting organizer 20 to schedule a meeting. In this regard, an initial meeting request from the meeting organizer 20 can serve as not only a scheduling request for the meeting organizer, but also as an invitation to the meeting invitees. In one or more embodiments, the request of step 102 corresponds to a request by one of the meeting invitees 22A-N to accept a meeting request from the meeting organizer 20.

The calendar server 14 determines, based on a predefined meeting policy, a maximum permissible quantity of meetings for the requesting user to participate in during a predefined time period that includes the specified date (block 104). The calendar server 14 compares a quantity of meetings in the shared calendar system that are already scheduled for the user to occur within the predefined time period to the maximum permissible quantity of meetings for the user (block 106). Based on the comparing indicating that the quantity of meetings already scheduled is greater than or equal to the maximum permissible quantity of meetings, the calendar server 14 transmits a notification to the user to indicate that approval of the scheduling requested would violate the predefined meeting policy for that user (block 108).

In one or more embodiments, certain classes of meetings can be excluded from inclusion in the "maximum permissible quantity of meetings." For example, in the determining of block 104, in some embodiments meetings of a first type (e.g., work-related meetings) are included in the quantity of meetings that are already scheduled, and meetings of a different second type (e.g., personal meetings) are excluded from the quantity of meetings that are already scheduled. One example way in which the types of meetings may be distinguished is by a field in the shared calendar system 12. For example, the meeting categorization feature in MICROSOFT OUTLOOK could be used to indicate whether a meeting was a work-related meeting (e.g., performance review), or a personal one (e.g., haircut, doctor appointment, etc.).

Figure 3:
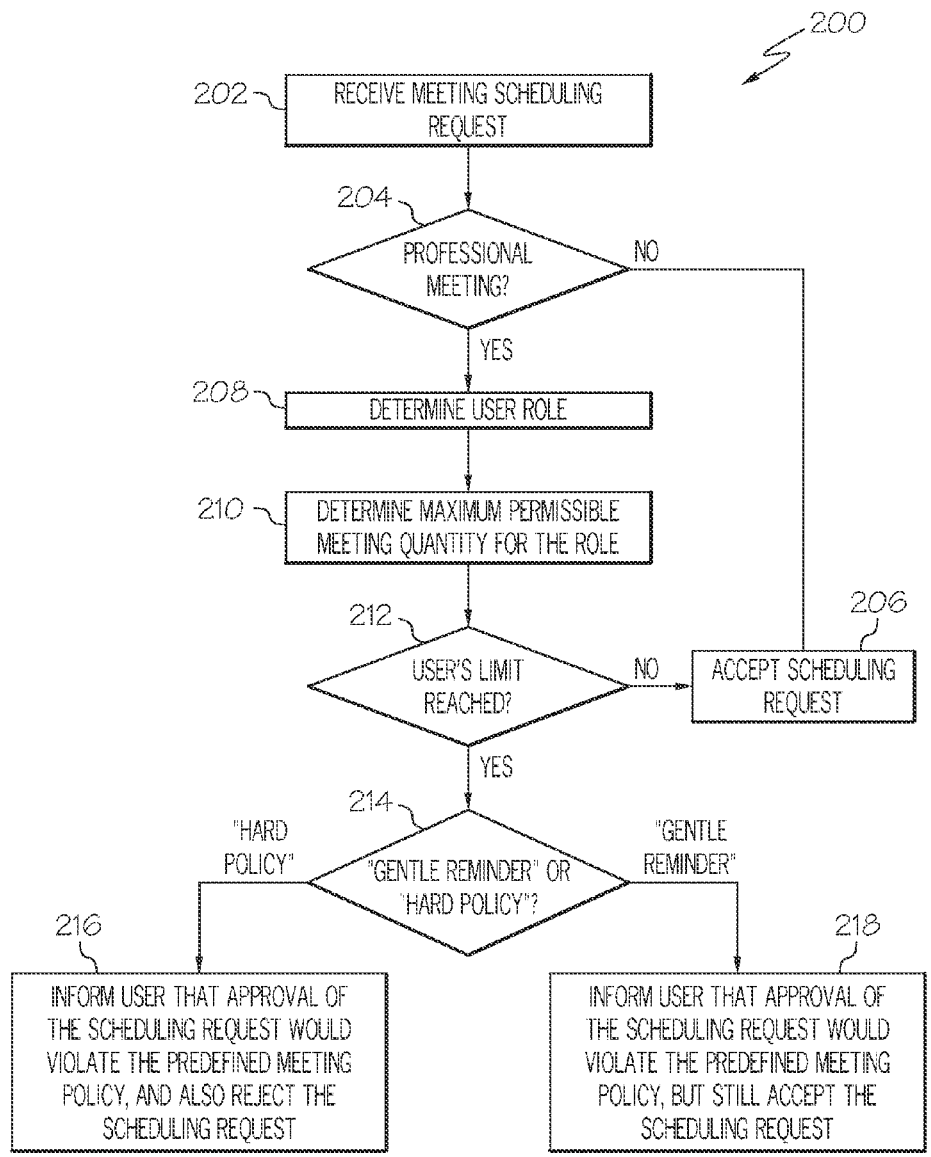
FIG. 3 illustrates an example implementation of the method of FIG. 2.

FIG. 3 illustrates an example implementation of the method of FIG. 2 in which the calendar server 14 has multiple modes of operation: a first mode utilizing a "hard policy" and a second mode utilizing a "gentle reminder." A meeting scheduling request is received to schedule a user as a participant in a meeting to occur on a specified date (block 202). As discussed above, this could include an initial meeting request from a meeting organizer 20, or a request by a meeting invitee 22 to accept a meeting invitation, for example. A determination is made as to whether the meeting is a professional meeting (i.e., if the meeting is a "first type" of meeting) or is a personal meeting (i.e., a different "second type" of meeting). If the meeting request is not a first type of meeting, the meeting scheduling request is accepted (block 206). In this regard, this embodiment of the method 100 places no limitations on the amount of personal meetings that can be scheduled in the shared calendar system 12 for users.

However, if the meeting is a "professional" one (i.e., first type), then the calendar server 14 determines a role of the requesting user (block 208), and based on that role determines a maximum permissible meeting quantity for the role during a predefined time period that includes the specified date (block 210). Assume, for example, that a user requests to be scheduled in a meeting on Tuesday, October 1st, and that the predefined time period is one week. In this example, the calendar server would determine the user's role, and then based on that role would determine how many meetings the user is permitted to participate in during the week that includes October 1st. Of course, other time periods could be used (e.g., one day, one month, a bi-weekly period, etc.). In one or more embodiments the user role is determined from contact information in the user database 18 that is accessible to the calendar server 14.

In one or more embodiments, higher level employees of an organization (e.g., supervisors and/or project managers) may have a greater permissible meeting quantity than lower level employees (e.g., those being supervised/managed). In any event, the method 100 can be used to ensure that certain classes of employees are not spending too much of their time unnecessarily in meetings. In one or more embodiments a look-up table is used determine the maximum permissible meeting quantity for the requesting user based on their role.

Referring again to FIG. 3, once the maximum permissible meeting quantity is determined, (block 210), that maximum permissible quantity is compared to a quantity of meetings already scheduled for the user during the predefined time period to determine whether the user's limit has already been reached (block 212). If the limit has not yet been reached, then the scheduling request is accepted (block 206). Thus, if the meeting scheduling request of block 202 corresponds to an initial meeting request from meeting organizer 20, then block 206 permits the meeting organizer 20 to be scheduled for that meeting, and the meeting request is sent to the other invitees 22 indicated in the request because the meeting organizer 20 has not exceeded their permissible quantity of meetings for the time period in question. If the meeting scheduling request of block 202 corresponds to an attempted acceptance from a meeting invitee 22, then block 206 permits the invitee to accept their received meeting request from meeting organizer 20.

In some embodiments, the calendar server 14 performs the method 100 such that the meeting organizer 20 is entirely unaware of whether the meeting invitees 22 have reached their limit of meetings. In these embodiments the method 100 is only performed for a given user once that user has requested to be scheduled in a given meeting. Thus, the method 100 is performed for the meeting organizer 20 when the organizer attempts to schedule the meeting, but is not performed for the invitees 22 until the invitees 22 attempt to accept their respective received meeting request.

Referring again to FIG. 3, if the determining of block 212 indicates that the quantity of meetings already scheduled is greater than or equal to the maximum permissible quantity of meetings, a notification is transmitted to the requesting user to indicate that approval of the scheduling request would violate the predefined meeting policy (blocks 214-218). In the embodiment of FIG. 3, this includes determining whether the calendar server 14 is using the first mode having a "hard policy" or the second mode having a "gentle reminder" (block 214).

If the first mode is being used, the requesting user is informed that approval of their scheduling request would violate the predefined meeting policy, and their scheduling request is correspondingly rejected (block 216). If the second mode is being used, then the user is informed that approval of their scheduling request would violate the predefined meeting policy, but their scheduling request is still accepted (block 218). Thus, if the first mode is used a user may need to cancel another scheduled meeting in order to obtain approval of the otherwise rejected scheduling request. In this regard, the "notification" of block 216 in some embodiments includes a notification that the user must cancel at least one meeting in the shared calendar system that is already scheduled for the user to occur within the predefined time period in order to obtain approval of the scheduling request. If the method 100 is being performed for meeting invitees, steps 216, 218 may include also notifying the meeting organizer 20 that approval of invitee acceptance of the proposed meeting they are organizing would violate the predefined meeting policy for one or more of the invitees.

In one or more embodiments, the "quantity" of meetings is based on a quantity of meeting units (e.g., units of time). For example, a one hour meeting may be considered to be 1 meeting, and a 3 hour meeting would be considered to be 3 meetings (e.g., considered to be three separate 1 hour meetings). In such embodiments, the maximum permissible quantity of meetings comprises a maximum permissible quantity of meeting units (e.g., meeting hours) which each have a same predefined duration, that is indicative of a total amount of time that the user is permitted to spend in meetings during the predefined time period (e.g., meeting hours).

In such embodiments, the quantity of meetings already scheduled comprises a sum of a quantity of meeting units of each meeting that is already scheduled for the user to occur during the predefined time period (e.g., a quantity of meeting hours scheduled). In such embodiments, a notification that approval of the scheduling request would violate the predefined policy is also transmitted if a quantity of meeting units of the requested meeting, when added to the quantity of meeting units that are already scheduled, would exceed the maximum permissible quantity of meeting units (e.g., if a user has 2 remaining meeting hours that can be permissibly scheduled, but the requested meeting is 3 hours long). In this regard, the method 100 could account for differences between users who schedule a larger quantity of shorter meetings and users who schedule a smaller quantity of longer meetings.

The method 100 can advantageously be used to exercise some degree of control over how many meetings employees schedule within a given time period. Excessive quantities of meetings can be a drain on productivity, and an organization could use the method 100 to determine how many meetings (or meeting units, e.g., hours) is acceptable during a given time period. This can also help to overcome employee reluctance to decline a meeting, especially from a supervisor, despite the employee believing that the meeting is not an effective use of their time. Correspondingly, if desired, the method 100 can be implemented so that less employee time is be spent in meetings, and more employee time is spent doing more substantive work.

In some instances an organization may wish to initially implement the method 100 in the first mode that utilizes the "hard policy" for an introductory time period to instill the idea of meeting limitations in its organization culture, and subsequently implement the method 100 in the second mode that utilizes the "gentle reminder" to allow greater flexibility. Alternatively, an organization may start by implementing the method 100 in the second mode ("gentle reminder"), and then subsequently evaluate whether it is necessary to ever implement the method 100 in the first mode ("hard policy"). In one or more embodiments, the method 100 is implemented in the first mode for a first subset of employees of an organization (e.g., non-management employees), and is implemented in the second mode for a different second subset of employees of the organization (e.g., management employees).

Figure 4:
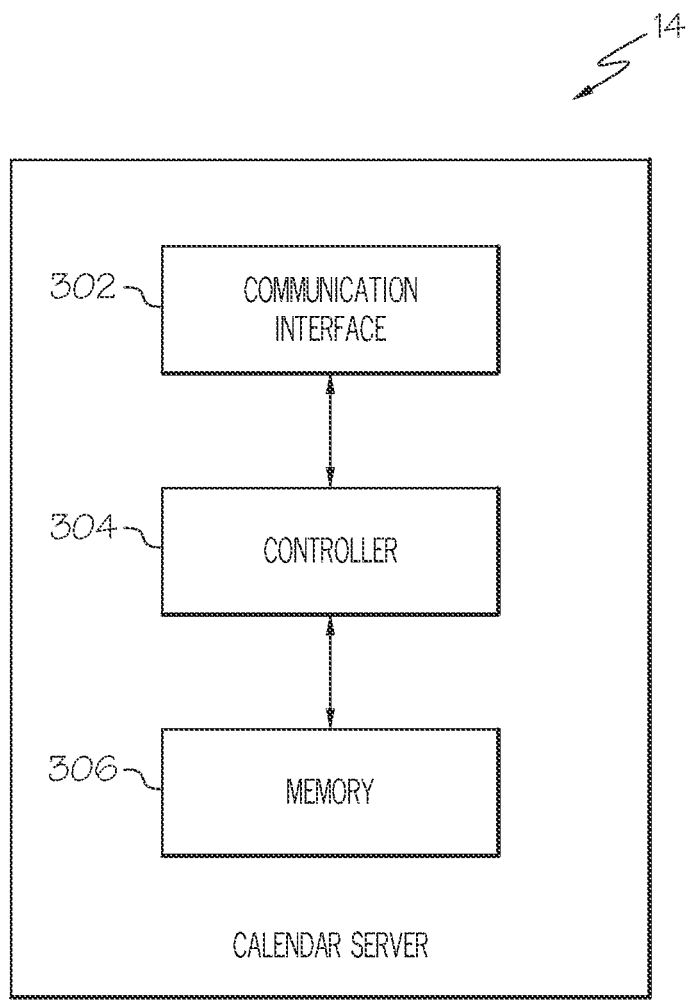
FIG. 4 illustrates an example computing device configured to implement the method of FIG. 2.

FIG. 4 is a block diagram that schematically illustrates an example implementation of a computing device implementing the method 100 (e.g., calendar server 14). As shown in FIG. 4, the calendar server 14 includes a communication interface 302 (e.g., an input/output device), a controller 304 (e.g., a microprocessor), and a computer readable storage medium (shown as "memory" 306). The controller 304 is configured to perform the method 100 according to one or more of the embodiments of above. Thus, the controller 305 is configured to receive, via the communication interface 302, a scheduling request from a user to schedule the user in the shared calendar system 12 as a participant in a meeting to occur on a specified date. The controller 304 is further configured to determine, based on a predefined meeting policy, a maximum permissible quantity of meetings for the user to participate in during a predefined time period that includes the specified date. The controller 304 is further configured to compare a quantity of meetings in the shared calendar system that are already scheduled for the user to occur within the predefined time period to the maximum permissible quantity of meetings for the user. The controller 304 is further configured to, based on the comparing indicating that the quantity of meetings already scheduled is greater than or equal to the maximum permissible quantity of meetings, transmit a notification to the user to indicate that approval of the scheduling request would violate the predefined meeting policy. In one or more embodiments, the memory 306 stores the predefined meeting policy, and/or stores a computer program product comprising computer readable program code embodied therewith to configure the calendar server 14 to implement the method 100.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    receiving a scheduling request to schedule a user in a shared calendar system as a participant in a meeting to occur on a specified date;
    determining, based on a predefined meeting policy, a maximum permissible quantity of meetings for the user to participate in during a predefined time period that includes the specified date, wherein determining the maximum permissible quantity of meetings for the user to participate in comprises including meetings of a first meeting type in the determination and excluding meetings of a different, second meeting type from the determination;
    comparing a quantity of meetings of the first meeting type in the shared calendar system that are already scheduled for the user to occur within the predefined time period to the maximum permissible quantity of meetings for the user;
    determining, whether the shared calendar system is currently operating in a first mode specifying strict adherence to the maximum permissible quantity of meetings, or a second mode specifying flexible adherence to the maximum permissible quantity of meetings; and
    based on the comparing indicating that the quantity of meetings of the first meeting type already scheduled is greater than or equal to the maximum permissible quantity of meetings, transmitting a notification to the user to indicate that approval of the scheduling request would violate the predefined meeting policy; and
    rejecting the scheduling request if the shared calendar system is currently operating in the first mode;
    approving the scheduling request if the shared calendar system is currently operating in the second mode;
    wherein the maximum permissible quantity of meetings comprises a maximum permissible quantity of meeting units, each having a same predefined duration, indicative of a total amount of time that the user is permitted to spend in meetings of the first meeting type during the predefined time period;
    wherein the quantity of meetings of the first meeting type already scheduled comprises a sum of a quantity of meeting units of each meeting of the first meeting type that is already scheduled for the user to occur during the predefined time period; and
    wherein a notification that approval of the scheduling request would violate the predefined meeting policy is also transmitted if a quantity of meeting units of the meeting of the first meeting type being requested, when added to the quantity of meeting units that are already scheduled, would exceed the maximum permissible quantity of meeting units.

2. The computer-implemented method of claim 1, wherein the meetings of the first meeting type are business meetings, and meetings of the second meeting type are personal meetings.

3. The computer-implemented method of claim 1, wherein the determining comprises:
    determining an assigned role of the user in the shared calendar system; and
    determining the maximum permissible quantity of meetings based on the assigned role of the user.

4. The computer-implemented method of claim 1, wherein if the shared calendar system is currently operating in the first mode, the notification indicating that approval of the scheduling request would violate the predefined meeting policy comprises a notification that the user must cancel at least one meeting of the first meeting type in the shared calendar system that is already scheduled for the user to occur within the predefined time period in order to obtain approval of the scheduling request.

5. The computer-implemented method of claim 1 further comprising:
    operating the shared calendar system in the first mode for a first predetermined time period; and
    switching the operating mode of the shared calendar system from the first mode to the second mode when the first predetermined time period expires.

6. The computer-implemented method of claim 1 further comprising operating the shared calendar system in one of the first mode or the second mode based on a classification of the user.

7. A computing device comprising:
    a communication interface; and
    a processing circuit configured to:
    receive, via the communication interface, a scheduling request to schedule a user in a shared calendar system as a participant in a meeting to occur on a specified date;
    determine, based on a predefined meeting policy, a maximum permissible quantity of meetings for the user to participate in during a predefined time period that includes the specified date, wherein determining the maximum permissible quantity of meetings for the user to participate in comprises including meetings of a first meeting type in the determination and excluding meetings of a different, second meeting type from the determination;
    compare a quantity of meetings of the first meeting type in the shared calendar system that are already scheduled for the user to occur within the predefined time period to the maximum permissible quantity of meetings for the user;

determining, whether the shared calendar system is currently operating in a first mode specifying strict adherence to the maximum permissible quantity of meetings, or a second mode specifying flexible adherence to the maximum permissible quantity of meetings; and based on the comparing indicating that the quantity of meetings of the first meeting type already scheduled is greater than or equal to the maximum permissible quantity of meetings, transmit a notification to the user to indicate that approval of the scheduling request would violate the predefined meeting policy; and rejecting the scheduling request if the shared calendar system is currently operating in the first mode; and approving the scheduling request if the shared calendar system is currently operating in the second mode;

wherein the maximum permissible quantity of meetings comprises a maximum permissible quantity of meeting units, each having a same predefined duration, indicative of a total amount of time that the user is permitted to spend in meetings during the predefined time period;

wherein the quantity of meetings of the first meeting type already scheduled comprises a sum of a quantity of meeting units of each meeting of the first meeting type that is already scheduled for the user to occur during the predefined time period; and wherein the processing circuit is further configured to transmit a notification that approval of the scheduling request would violate the predefined meeting policy if a quantity of meeting units of the meeting of the first meeting type being requested, when added to the quantity of meeting units that are already scheduled, would exceed the maximum permissible quantity of meeting units.

8. The computing device of claim 7, wherein the meetings of the first meeting type are business meetings, and meetings of the second meeting type are personal meetings.

9. The computing device of claim 7, wherein to determine the maximum permissible quantity of meetings for the user, the processing circuit is configured to:
  determine an assigned role of the user in the shared calendar system; and
  determine the maximum permissible quantity of meetings based on the assigned role of the user.

10. The computing device of claim 7, wherein if the shared calendar system is currently operating operate in the first mode, the notification indicating that the requested meeting violates the predefined meeting policy comprises a notification that the user must cancel at least one meeting of the first meeting type in the shared calendar system that is already scheduled for the user to occur within the predefined time period in order to obtain approval of the scheduling request.

11. A computer program product comprising:
  a non-transitory computer readable storage medium having computer readable program code stored thereon that is executable by a processing circuit to cause a computing device to:
  receive a scheduling request to schedule a user in a shared calendar system as a participant in a meeting to occur on a specified date;
  determine, based on a predefined meeting policy, a maximum permissible quantity of meetings for the user to participate in during a predefined time period that includes the specified date, wherein determining the maximum permissible quantity of meetings for the user to participate in comprises including meetings of a first meeting type in the determination and excluding meetings of a different, second meeting type from the determination;
  compare a quantity of meetings of the first meeting type in the shared calendar system that are already scheduled for the user to occur within the predefined time period to the maximum permissible quantity of meetings for the user;
  determine, whether the shared calendar system is currently operating in a first mode specifying strict adherence to the maximum permissible quantity of meetings, or a second mode specifying flexible adherence to the maximum permissible quantity of meetings; and
  based on the comparing indicating that the quantity of meetings of the first meeting type already scheduled is greater than or equal to the maximum permissible quantity of meetings, transmit a notification to the user to indicate that approval of the scheduling request would violate the predefined meeting policy; and
  reject the scheduling request if the shared calendar system is currently operating in the first mode;
  approve the scheduling request if the shared calendar system is currently operating in the second mode;
  wherein the maximum permissible quantity of meetings comprises a maximum permissible quantity of meeting units, each having a same predefined duration, indicative of a total amount of time that the user is permitted to spend in meetings of the first meeting type during the predefined time period;
  wherein the quantity of meetings of the first meeting type already scheduled comprises a sum of a quantity of meeting units of each meeting of the first meeting type that is already scheduled for the user to occur during the predefined time period; and
  wherein the computer readable program code further causes the computing device to transmit a notification that approval of the scheduling request would violate the predefined meeting policy if a quantity of meeting units of the meeting of the first meeting type being requested, when added to the quantity of meeting units that are already scheduled, would exceed the maximum permissible quantity of meeting units.

12. The computer program product of claim 11, wherein the meetings of the first meeting type are business meetings, and meetings of the second meeting type are personal meetings.

13. The computer program product of claim 11, wherein the computer readable program code further causes the computing device to:
  determine an assigned role of the user in the shared calendar system; and
  determine the maximum permissible quantity of meetings based on the assigned role of the user.

14. The computer program product of claim 11, wherein if the shared calendar system is currently operating in the first mode, the notification indicating that approval of the scheduling request would violate the predefined meeting policy comprises a notification that the user must cancel at least one meeting of the first meeting type in the shared calendar system that is already scheduled for the user to occur within the predefined time period in order to obtain approval of the scheduling request.

* * * * *